US012698102B2

(12) United States Patent
Donato et al.

(10) Patent No.: US 12,698,102 B2
(45) Date of Patent: Aug. 4, 2026

(54) SYSTEM, METHOD, AND BRACKET ASSEMBLY FOR A STABLE AND REPEATABLE SPACECRAFT PLATFORM STRUCTURE

(71) Applicant: MacDonald, Dettwiler and Associates Corporation, Sainte-Anne-de-Bellevue (CA)

(72) Inventors: Samuel Donato, Notre-Dame-de-l'Ile-Perrot (CA); Sébastien Dame, Hudson (CA); Patrick Le Rossignol, Saint-Lazare (CA)

(73) Assignee: MacDonald, Dettwiler and Associates Corporation, Sainte-Anne-de-Bellevue (CA)

( * ) Notice: Subject to any disclaimer, the term of this patent is extended or adjusted under 35 U.S.C. 154(b) by 0 days.

(21) Appl. No.: 19/169,679

(22) Filed: Apr. 3, 2025

(65) Prior Publication Data

US 2025/0326502 A1 Oct. 23, 2025

Related U.S. Application Data

(60) Provisional application No. 63/635,684, filed on Apr. 18, 2024.

(51) Int. Cl.
B64G 1/22 (2006.01)
(52) U.S. Cl.
CPC ................................... B64G 1/223 (2023.08)
(58) Field of Classification Search
CPC .............. B64G 1/223; B64G 1/64; F16B 5/01
See application file for complete search history.

(56) References Cited

U.S. PATENT DOCUMENTS 5,324,146 A * 6/1994 Parenti .................... F16B 43/00
244/158.1
5,527,023 A * 6/1996 Starr ...................... B23Q 3/186
279/2.17
(Continued)

FOREIGN PATENT DOCUMENTS

CN 102514730 A * 6/2012
CN 116062185 A * 5/2023 .............. B64G 1/10

OTHER PUBLICATIONS

Extended European Search Report for European Patent Application No. 25169075.6 dated Jul. 15, 2025.

*Primary Examiner* — Justin M Benedik
(74) *Attorney, Agent, or Firm* — Own Innovation; James W. Hinton; Kent C. Howe

(57) ABSTRACT

Systems, methods, and bracket assemblies for a stable and repeatable spacecraft platform structure are provided. The method includes: providing a plurality of panel interconnect (PIC) bracket assemblies for connecting first and second adjacent platform panels; supporting and aligning the first and second platform panels in a vertical configuration using three points of support; installing the PIC bracket assemblies between the first and second platform panels; co-drilling a subset of the PIC bracket assemblies to establish co-drilled holes that traverse the first and second bracket; disassembling the bolted interfaces of PIC bracket assemblies to remove the first or second platform panel; and reinstalling the first or second panel using an expansion pin in the co-drilled holes to return the first or second platform panel to its quasi 0 G shape.

20 Claims, 13 Drawing Sheets

(56)          References Cited

U.S. PATENT DOCUMENTS 9,097,003 B1 * 8/2015 Sultan ..................... B64C 1/069
2011/0296675 A1    12/2011 Roopnarine et al.

* cited by examiner

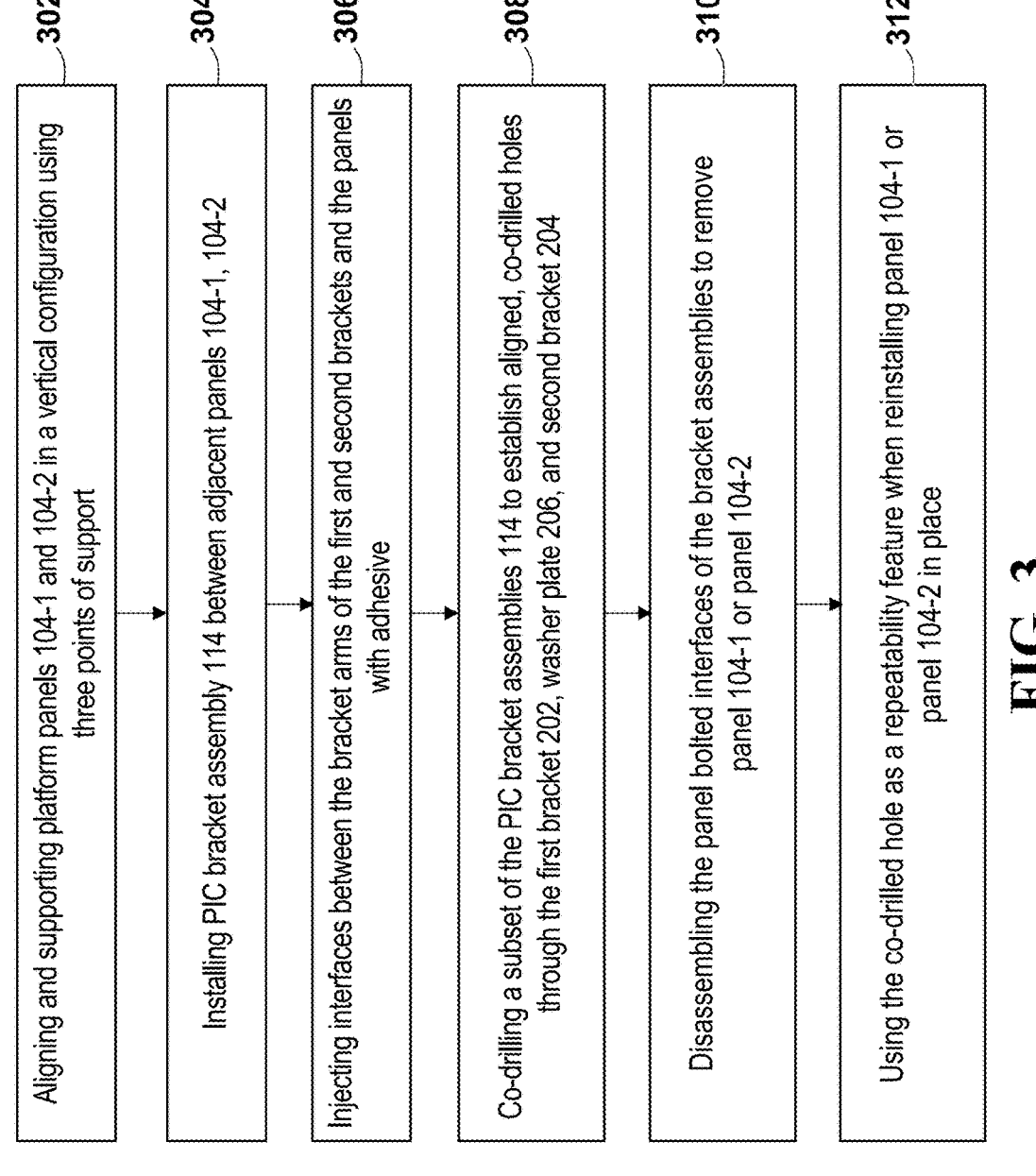

302　Aligning and supporting platform panels 104-1 and 104-2 in a vertical configuration using three points of support 304　Installing PIC bracket assembly 114 between adjacent panels 104-1, 104-2

306　Injecting interfaces between the bracket arms of the first and second brackets and the panels with adhesive 308　Co-drilling a subset of the PIC bracket assemblies 114 to establish aligned, co-drilled holes through the first bracket 202, washer plate 206, and second bracket 204

310　Disassembling the panel bolted interfaces of the bracket assemblies to remove panel 104-1 or panel 104-2

312　Using the co-drilled hole as a repeatability feature when reinstalling panel 104-1 or panel 104-2 in place

SYSTEM, METHOD, AND BRACKET ASSEMBLY FOR A STABLE AND REPEATABLE SPACECRAFT PLATFORM STRUCTURE

TECHNICAL FIELD

The following relates generally to spacecraft platforms, and more particularly to a stable and repeatable spacecraft platform structure.

INTRODUCTION

Spacecraft platforms are used as the structural foundation for mounting systems and instruments necessary for space missions, including navigation, communication, scientific research, and payload delivery.

Most spacecraft platforms are composed of aluminum honeycomb panels connected together with embedded inserts either directly or indirectly via intermediate brackets.

Standard embedded inserts and honeycomb panels are insufficiently durable for the rigorous environmental demands encountered by spacecraft. Further, in the context of space applications, alternative platforms employ externally attached components known as "cleats," such as those seen on the Radarsat-2 Bus by Alenia. The specifics regarding the consistency and reliability of these components under the unique conditions of space operations, however, remain undefined.

Therefore, there is a need for a strong, stable, and precise platform that provides flexibility for accessing internal units at any step during Assembly, Integration, and Testing (AI&T). Internal units include any components of the spacecraft assembly that are found within the spacecraft primary structure and require removing a panel to access.

Accordingly, there is a need for an improved spacecraft platform that overcomes at least some of the disadvantages of existing spacecraft platforms.

SUMMARY

A method of assembling a spacecraft platform structure comprising a plurality of platform panels is provided. The method includes providing a plurality of panel interconnect (PIC) bracket assemblies for connecting first and second adjacent platform panels, each PIC bracket assembly comprising: a first bracket comprising a U-clip portion for receiving an edge of the first platform panel and a flange plate extending from the U-clip portion orthogonal to the edge when the edge is disposed in the U-clip portion; a second bracket comprising a U-clip portion for receiving an edge of the second platform panel; wherein the edge of the first platform panel and the edge of the second platform panel are orthogonal to one another in an assembled configuration of the spacecraft platform structure; wherein the U-clip portions of the first and second brackets each include first and second bracket arms that attach to face sheets of the first and second platform panels, respectively; and a bolted interface for connecting the flange plate of the first bracket to a portion of the second bracket disposed along the edge of the second platform panel. The method further includes: supporting and aligning the first and second platform panels in a vertical configuration using three points of support; installing the PIC bracket assemblies between the first and second platform panels, the installing including temporarily securing the PIC bracket assemblies in place without direct attachment to the first and second platform panels; applying adhesive between the first and second bracket arms of the first and second brackets to bond the PIC bracket assemblies to the first and second platform panels; co-drilling a subset of the PIC bracket assemblies to establish co-drilled holes that traverse the first and second bracket; disassembling the bolted interfaces of PIC bracket assemblies to remove the first or second platform panel; and reinstalling the first or second panel using an expansion pin in the co-drilled holes to return the first or second platform panel to its quasi 0 G shape.

In an embodiment, the spacecraft platform structure is a spacecraft bus.

In an embodiment, the subset of the PIC bracket assemblies is at least two PIC bracket assemblies.

In an embodiment, the at least two brackets include the two outermost PIC bracket assemblies along the edges.

In an embodiment, the two outermost PIC bracket assemblies are located at or near opposing ends of the edges of the first and second platform panels.

In an embodiment, the expansion pin has a smaller diameter than the co-drilled holes when unexpanded and the same diameter as the co-drilled holes once the expansion pin has expanded and realigns the co-drilled holes to be coaxial once expanded.

In an embodiment, the first and second brackets are arranged on the plurality of panels such that each panel of the plurality of panels does not have more than two orthogonal mounting planes defined by mounting interfaces of the first and second brackets on that panel.

In an embodiment, the method further includes mounting a device configured for use in space to at least at least one of the PIC bracket assemblies via the bolted interface.

In an embodiment, the device includes at least two supports, and the two supports are mounted to different ones of the PIC bracket assemblies via their respective bolted interfaces.

In an embodiment, the method further includes performing the method for all adjacent platform panels in the spacecraft platform structure.

In an embodiment, the subset of the PIC bracket assemblies is at least two PIC bracket assemblies such that there are at least two PIC bracket assemblies per panel edge.

In an embodiment, the first and second bracket arms include a plurality of holes, and applying the adhesive includes injecting the adhesive through the plurality of holes.

In an embodiment, the plurality of holes are equally spaced from one another and arranged in a straight line.

In an embodiment, applying the adhesive includes injecting the adhesive at multiple edges of each of the first and second bracket arms.

In an embodiment, the flange plate is disposed such that an interface plane formed between the flange plate and the portion of the second bracket disposed along the edge of the second platform panel is at approximately a midline of a portion of the first bracket disposed along the edge of the first platform panel.

In an embodiment, the bolted interface is configured such that the first and second platform panels each have only a single interface plane in each axis.

An apparatus is also provided. The apparatus comprises a spacecraft platform structure. The spacecraft platform structure includes a plurality of panels connected along their respective edges using a plurality of panel interconnect (PIC) bracket assemblies, wherein each PIC bracket assembly includes first and second brackets each bonded to panel face sheets along edges of adjacent panels, the first and second brackets secured together by fasteners.

In an embodiment, at least two PIC bracket assemblies per edge of the spacecraft platform structure have co-drilled holes for repeatable installation of the panels during assembly.

A system for connecting first and second adjacent panels of a spacecraft platform is also provided. The system includes a plurality of bracket assemblies for connecting the adjacent panels along first and second orthogonal edges. Each bracket assembly includes: a first bracket mounted on the first orthogonal edge, the first bracket comprising first, second, and third sides defining a square U shaped recess for receiving the first orthogonal edge, the first and second sides being generally parallel to one another and extending in the same direction from opposing edges of the third side, the third side generally orthogonal to the first and second sides, the first bracket further comprising a flange plate generally orthogonal to and extending from the third side in a direction opposite the first and second sides; a second bracket mounted on the second orthogonal edge, the second bracket comprising first, second, and third sides defining a square U shaped recess for receiving the second orthogonal edge, the first and second sides being generally parallel to one another and extending in the same direction from opposing edges of the third side, the third side generally orthogonal to the first and second sides; and at least one fastener for securing the flange plate of the second bracket to the third side of the first bracket. The first and second sides of the first bracket are bonded to top and bottom face sheets of the first adjacent panel and the first and second sides of the second bracket are bonded to top and bottom face sheets of the second adjacent panel.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 3 is a flow diagram of a method of assembling a stable and repeatable spacecraft platform structure, such as the platform structure of FIG. 1, according to an embodiment;

DETAILED DESCRIPTION

Figure 1:
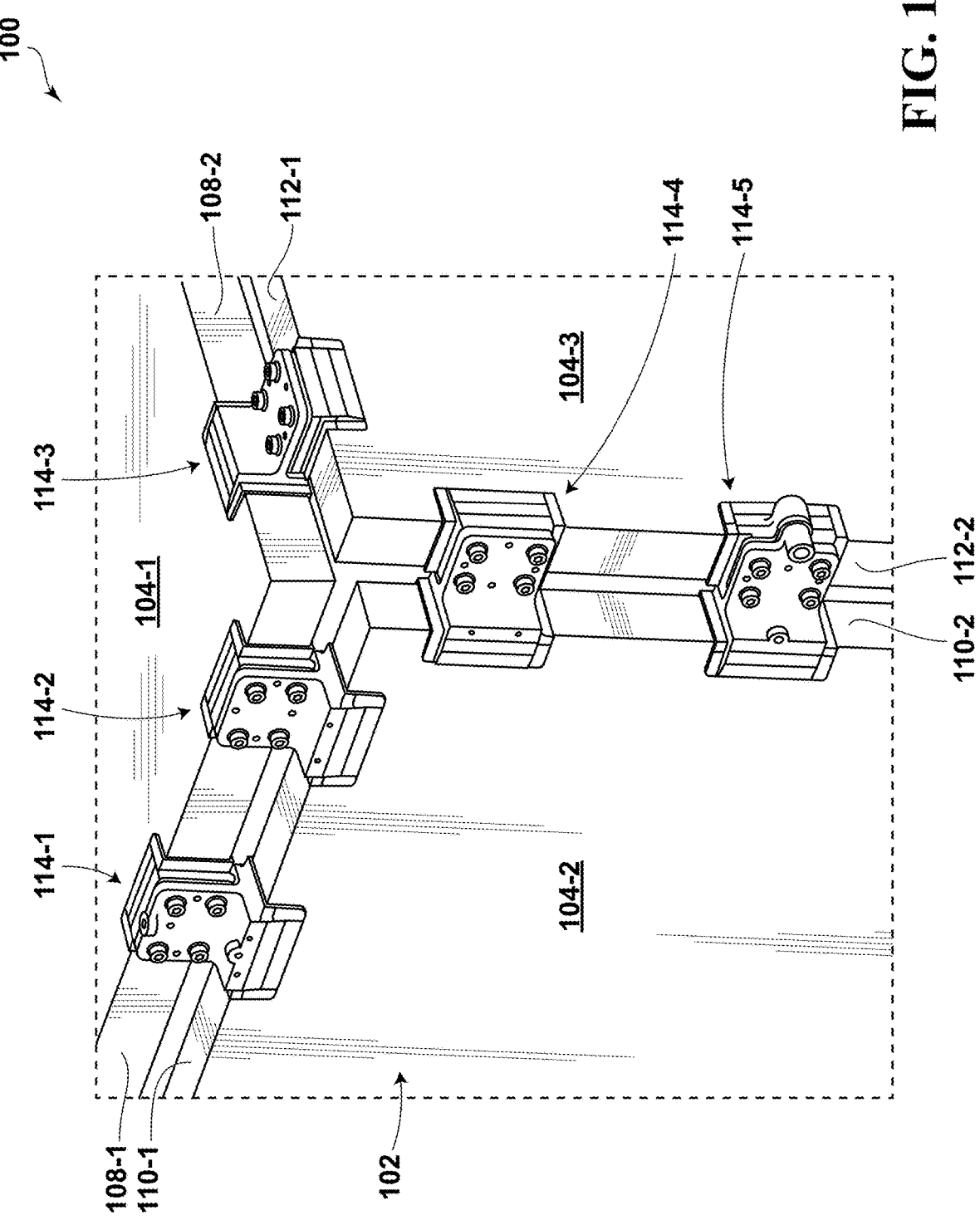
FIG. 1 is a perspective view schematic diagram of a portion of a spacecraft including a system for a stable and repeatable spacecraft platform, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The following relates generally to spacecraft platforms, and more particularly to systems and methods for a stable and repeatable spacecraft platform structure.

The system of the present disclosure connects spacecraft platform panels along their edges using panel interconnect bracket assemblies. Each bracket assembly includes a pair of brackets, each bonded to the panel face sheets along the edges of adjacent panels. Each pair of brackets is secured together with fasteners.

The bracket assemblies are bonded to panel face sheets (e.g., instead of using embedded inserts), providing increased structural margins. Structural margins refer to where structural analysis is performed on the components and each analysis has "allowable" maximums that the components can resist before they break. Structural margins are how far away you are from these "allowable" maximums. Increased structural margins provided by the bracket assemblies of the present disclosure provide greater confidence in your design.

The system for platform assembly enables a stress-free initial assembly using three-point supports and liquid shimming.

The system for platform assembly includes repeatability features between each platform panel using expansion pins. Repeatability features ensure that a panel can be removed and reinstalled in exactly the same position without any relative movement to the rest of the structure. The expansion pins provide this by forcing co-drilled holes created during the initial assembly to re-align. This is because the expansion pins have a smaller diameter than the co-drilled holes in their unexpanded state, but the same diameter as the co-drilled holes once expanded. This ensures that when the expansion pin is expanded, it will realign the co-drilled holes to be coaxial.

The geometry of the bracket assembly enables easy removal of platform panels without jamming. The mounting interface between all bracket assemblies on each panel have a maximum of two orthogonal mounting planes. This ensures that the panels are never "sandwiched" between two parallel panels, avoiding any jamming due to panel deformations.

The system for platform assembly of the present disclosure may provide particular advantages. The platform assembled using the system of the present disclosure may be very strong and rigid to support large deployable payloads. Using the system, platform panels can be precisely positioned to ensure accurate interfaces for mounted components. The panels may be characterized using a laser tracker prior to integration to directly measure all of the interfaces on the panels. The panels may then be aligned using an exoskeleton tooling to minimize the deviations of the interfaces. The initial build of the platform is in a quasi-0 G configuration so that the shape closely resembles the on-orbit shape. The platform is assembled in a stress-free manner so that it remains stable throughout AI&T. The system for platform assembly allows for easy removal of repeatable installation of a majority of platform panels. This provides for a flexible AI&T sequence and enables easy access to internal units (i.e., units disposed or contained within the spacecraft platform structure) in case of malfunction.

Referring now to FIG. 1, shown therein is a system 100 for a stable and repeatable spacecraft platform structure, according to an embodiment.

The system 100 provides a strong, stable, and precise spacecraft platform with lots of AI&T flexibility.

The system 100 is used on a spacecraft platform 102. The spacecraft platform 102 may be the main body and structural component of a spacecraft (e.g., spacecraft bus). For example, the spacecraft platform 102 may be a main body in which or on which payloads or scientific instruments are disposed. In an example, the spacecraft platform 102 may be a satellite bus.

The platform 102 includes a plurality of platform panels (simply referred to as panels). The platform panels include panels 104-1, 104-2, and 104-3. The platform 102 includes additional panels that are not visible in the view of FIG. 1. Such panels may also be connected to one or more other panels of the platform 102 in a similar manner to that described below in reference to panels 104-1, 104-2, 104-3. Platform panels 104-1, 104-2, 104-3 are also referred to collectively as panels 104 and generically as panel 104.

Exterior or outward-facing surfaces of the panels 104 may together form an exterior surface of the spacecraft. Panels 104, when assembled, may define an interior compartment of the spacecraft 100 within which components may be disposed or mounted. Further, components may be mounted to any panel 104. In particular, panel 104-1 may represent a top platform and provide a primary mounting surface for the spacecraft 100.

In FIG. 1, panels 104-1, 104-2, 104-3 are generally rectangular in shape. In other embodiments, panels 104 may have any other shape that provides edges suitable to be joined by the system 100.

Platform panel 104-1 includes edges 108-1 and 108-2. Platform panel 104-2 includes edges 110-1 and 110-2. Platform panel 104-3 includes edges 112-1 and 112-2. The edges 108-1, 108-2, 110-1, 110-2, 112-1, 112-2 are generally square or orthogonal.

Platform panel 104-1 and platform panel 104-2 are arranged such that their respective edges 108-1, 110-1 are orthogonal or perpendicular to one another.

Platform panel 104-1 and platform panel 104-3 are arranged such that their respective edges 108-2, 112-1 are orthogonal or perpendicular to one another.

Platform panel 104-2 and platform panel 104-3 are arranged such that their respective edges 110-2, 112-2 are orthogonal or perpendicular to one another.

The system 100 includes a plurality of panel interconnect brackets ("PICs") including PICs 114-1, 114-2, 114-3, 114-

4, 114-5 for connecting adjacent, orthogonal panels. Each PIC may be referred to herein as a bracket assembly. PICs 114-1, 114-2, 114-3, 114-4, 114-5 may be referred to collectively as PICs or bracket assemblies 114 and generically as PIC or bracket assembly 114.

Bracket assemblies 114-1, 114-2, connect panels 104-1 and 104-2 along edges 108-1 and 110-1. Bracket assembly 114-3 connects panels 104-1 and 104-3 along edges 108-2 and 112-1. Bracket assemblies 114-4, 114-5 connect panels 104-2 and 104-3 along edges 110-2 and 112-2.

While five PICs 114 are shown in FIG. 1, in variations, the number of PICS 114 may vary. It is to be further understood that the system 100 includes further PICs 114 not visible in FIG. 1.

The strength of each PIC 114 interface may be qualified via testing of panel coupons. Based on the structural analysis of the spacecraft, the number of PICs 114 required per panel edge can be determined to ensure that predicted loads are not exceeded.

In some implementations, use of the system 100 of FIG. 1 may result in presence of gaps along the edges of the platform structure 102 due to the geometry of the PIC bracket assemblies 114, such that the platform 102 does not provide a continuous sealed enclosure. As such, in some embodiments, additional shielding may be required along the edges of the platform 102 to prevent interference between internal and external units on the spacecraft platform 102. Accordingly, methods of assembly described herein may further include, in some embodiments, applying EMC shielding along the edges of the platform 102 after assembling the platform 102 using the bracket assemblies 114.

It should be noted that, while all bracket assemblies 114 have certain structural features in common (i.e., the same overall design), there may also be structural differences between bracket assemblies 114. For example, some bracket assemblies may have co-drilled holes (as described herein) and some bracket assemblies may not. This can be seen in FIG. 1, where bracket assembly 114-5 includes co-drilled holes and the visible other bracket assemblies 114 do not. In an embodiment, each panel edge has at least two bracket assemblies 114 with co-drilled holes (e.g., two PICs 114 per panel edge). Further, some bracket assemblies 114 may have brackets with special interface geometry, jaw geometry, or different lengths depending on the implementation.

Further details of the bracket assemblies 114 will now be described.

Figure 2A:
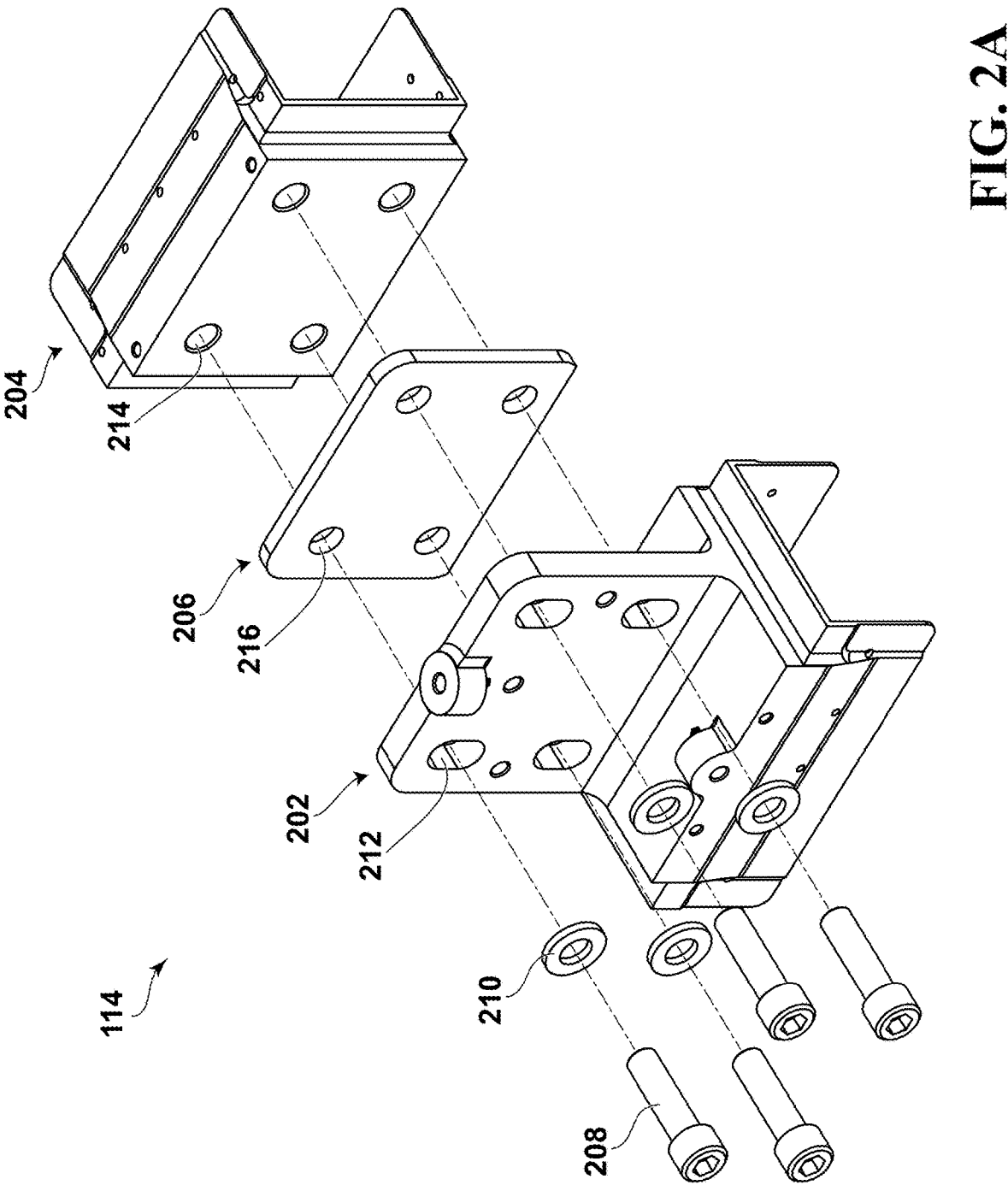
FIG. 2A is an exploded perspective view of a panel interconnect bracket assembly of FIG. 1, in isolation.
Figure 2B:
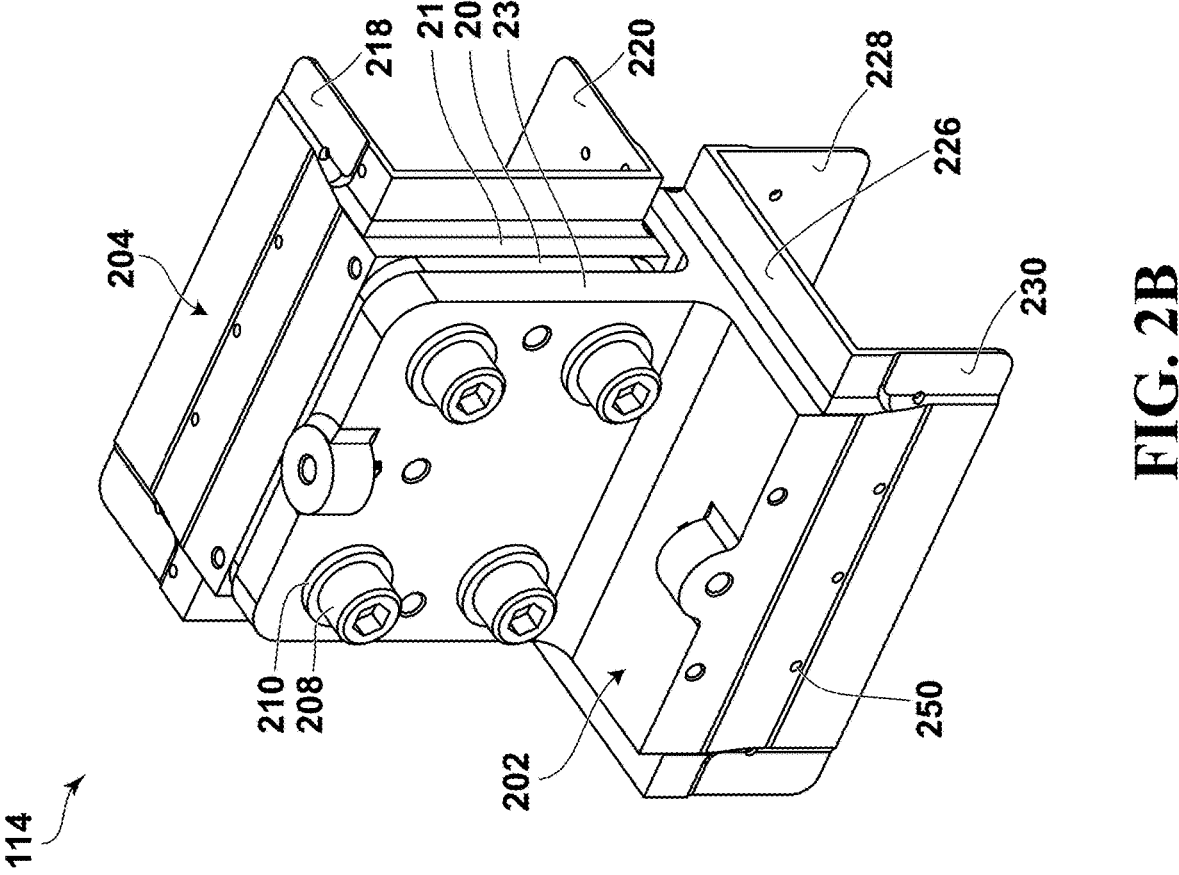
FIG. 2B is a perspective view of the bracket assembly of FIG. 2A in an assembled configuration.
Figure 2C:
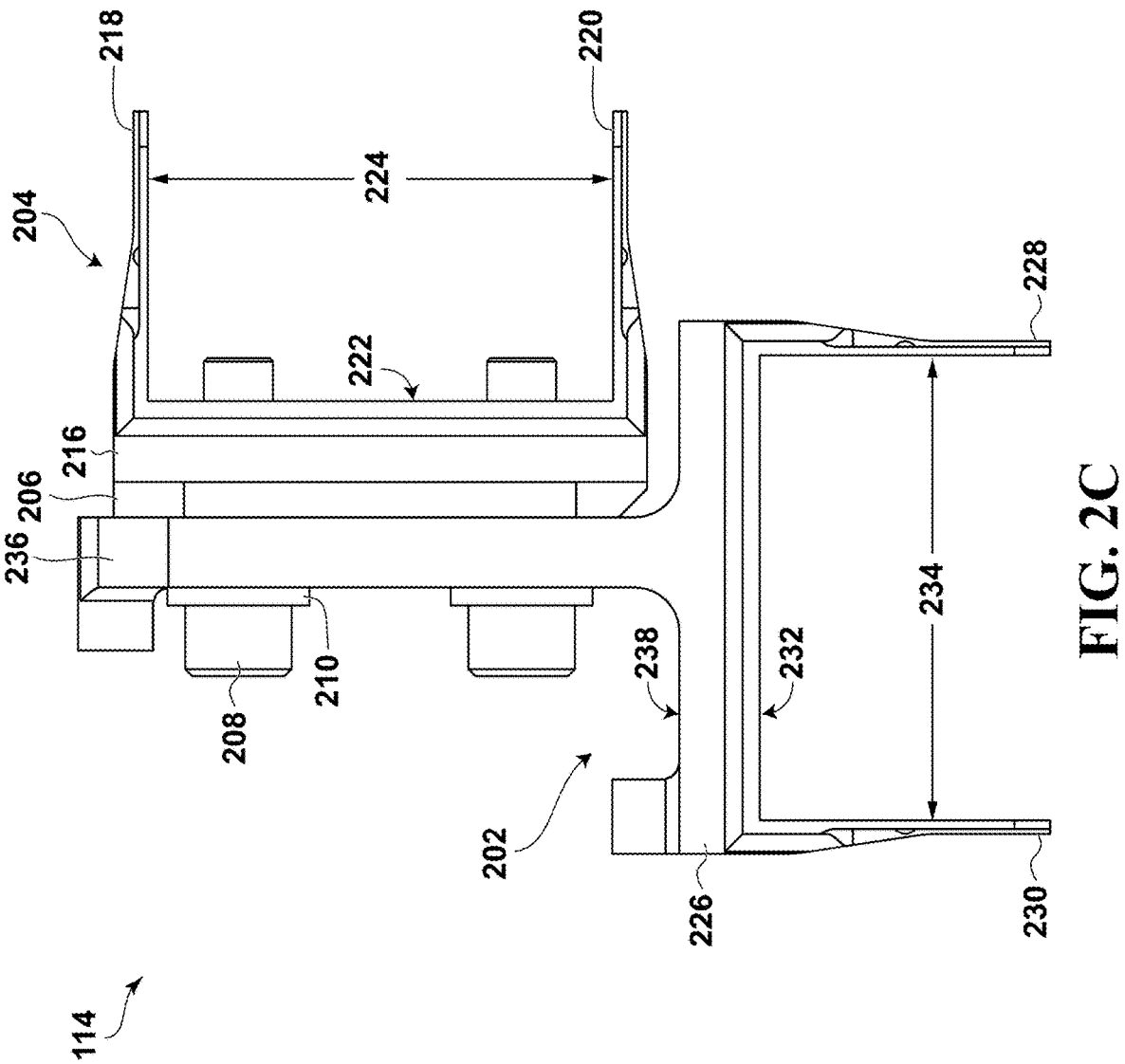
FIG. 2C is a side view of the bracket assembly of FIG. 2B.

Referring now to FIGS. 2A-2C, shown therein is a bracket assembly 114 in isolation, according to an embodiment. The bracket assembly 114 is a generic example and may be used as any of PICs 114 of FIG. 1.

The bracket assembly 114 includes a first bracket 202, a second bracket 204, a shim plate 206, threaded fasteners 208, and washers 210.

The first bracket 202, second bracket 204, and shim plate 206 each include a plurality of fastener holes 212, 214, 216, respectively, for receiving fasteners 208 therethrough. While the number of fasteners and fastener holes in FIGS. 2A-2C is four, any number of fasteners may be used that provides the requisite connection between components 202, 204, 206.

In an embodiment, first and second brackets 202, 204 are made of aluminum. In other embodiments, first and second brackets 202, 204 may be made of other metals based on the coefficient of thermal expansion of the panels.

Second bracket 204 has a square "U" shaped structure including sides 216, 218, 220. Side 216 may be referred to as top side 216 and sides 218, 220 may be referred to as arms 218, 220. Sides 216, 218, 220 are generally rectangular. Sides 218, 220 are the same size.

Sides 218, 220 extend from opposing outer edges of a bottom surface 222 of top side 216 such that the sides 218, 220 are generally orthogonal to bottom surface 222. Sides 218, 220 are generally parallel to one another and define a gap 224 therebetween.

Sides 218, 220 and bottom surface 222 of top side 216 form a square U shape for receiving a generally square edge of a platform panel in gap 224.

First bracket 202 includes a first portion that has a square "U" shaped structure, similar to second bracket 204, including sides 226, 228, and 230. Side 226 may be referred to as top side 226 of the first portion and sides 228, 230 may be referred to as arms 228, 230. Sides 226, 228, 230 are generally rectangular. Sides 228, 230 are the same size.

Sides 228, 230 extend from opposing outer edges of a bottom surface 232 of top side 226 such that the sides 228, 230 are generally orthogonal to bottom surface 232. Sides 228, 230 are generally parallel to one another and define a gap 234 therebetween.

Sides 228, 230 and bottom surface 232 of top side 226 form a square U shape for receiving a generally square edge of a platform panel in gap 234, similar to second bracket 204.

First bracket 202 further includes a flange plate 236 extending perpendicularly from a top surface 238 of the top side 226. The flange plate 236 is integrally formed with the top side 226. The flange plate 236 is used to connect the first bracket 202 to the second bracket 204. When assembled, shim plate 206 is disposed between the flange plate 236 of the first bracket 202 and the top side 216 of the second bracket 204. In an embodiment, the flange plate 236 may be positioned such that the interface plane between the two brackets 202, 204 is at the midplane of surface 226. Positioning the flange plate 236 and interface plane in such a manner may provide optimal performance of the bracket assembly. In other embodiments, the positioning of the flange plate 236 (and as a result the interface plane of the two brackets) may be other than at the midplane of top side 226 (e.g., due to specific geometric limitations). In general, the flange plate 236 may be positioned as close to the midplane as possible while taking into consideration other design constraints. Optimal performance is when the interface plane between the two PICs is at the midplane of surface 226.

The bracket assembly 114 in its assembled configuration or state is shown in FIGS. 2B-2C. The bracket assembly 114 is secured together by disposing shim plate 206 between flange plate 236 of first bracket 202 and top side 216 of second bracket 204, aligning the fastener holes 212, 216, 214 of the respective components 202, 206, 204, inserting the fasteners 208 through the fastener holes 212, 216, 214, and securing the fasteners 208 to connect the first bracket 202 to the second bracket 204. The shim 206 is mounted to bracket 204 using an adhesive along the edges. Mounting the shim 206 to bracket 204 is not required but makes the assembly/disassembly of these interfaces easier.

The bracket assembly 114 is used to connect two adjacent orthogonal platform panels. An edge of a first of the platform panels in positioned in the U-shaped gap 234 of the first bracket 202. An edge of the second platform panel is positioned in the U-shaped gap 224 of the second bracket 204. The U-shaped portions of the first and second brackets 202, 204 are bonded to the respective platform panels using a bonding agent that is disposed between the inner surfaces of the bracket arms 218, 220, 228, 230 and the top and bottom surfaces of the edges of the received panels.

Bracket arms 228, 230 of first bracket 202 and bracket arms 218, 220 of second bracket 204 each include a plurality of holes 250 for receiving adhesive (e.g., injecting adhesive) to bond the bracket arms to the panels. Adhesive holes 250 may be disposed in a straight line. Adhesive holes 250 may be evenly spaced. Adhesive holes 250 may be sized according to the total number of holes, the amount of adhesive being applied, and desired dispersion characteristics of the adhesive. Adhesive holes 250 may be positioned at or near the midline of the bracket arm (e.g., halfway up the arm towards surface 226). The number of adhesive holes 250 may vary and may be chosen based on the size of the holes, the amount of adhesive being added, and the desired dispersion characteristics of the adhesive. In the example of FIG. 2B, the number of adhesive holes 250 per bracket arm is five. The provision and use of adhesive holes 250 on the bracket arms may advantageously provide for the most efficient application of adhesive.

In other embodiments, the bracket arms may not have adhesive holes. In such a case, adhesive may be injected or otherwise applied from the edges (rather than along the length through the holes). Such application of adhesive is not as efficient.

Brackets 202 and 204 also include variation in the thickness of sides (e.g., arms 228, 230, 218, 220, top sides 216, 226). Such thickness variation may be chosen and used to minimize local stresses in the bonded interface (i.e., spread out the loading across the whole bonded region). In the case of bracket 114, each of the bracket arms 228, 230, 218, 220 has a thicker middle portion that is flanked by thinner portions on each side of the thicker middle portion. Similarly, top sides 226, 216 each have a thicker middle portion that is flanked by thinner portions on each side of the thicker middle portion. In some cases, the thicker middle portion or thinner outer portions may have variable thickness within their respective portions. In other embodiments, a bracket arm or a top side may have uniform thickness.

Figure 6:
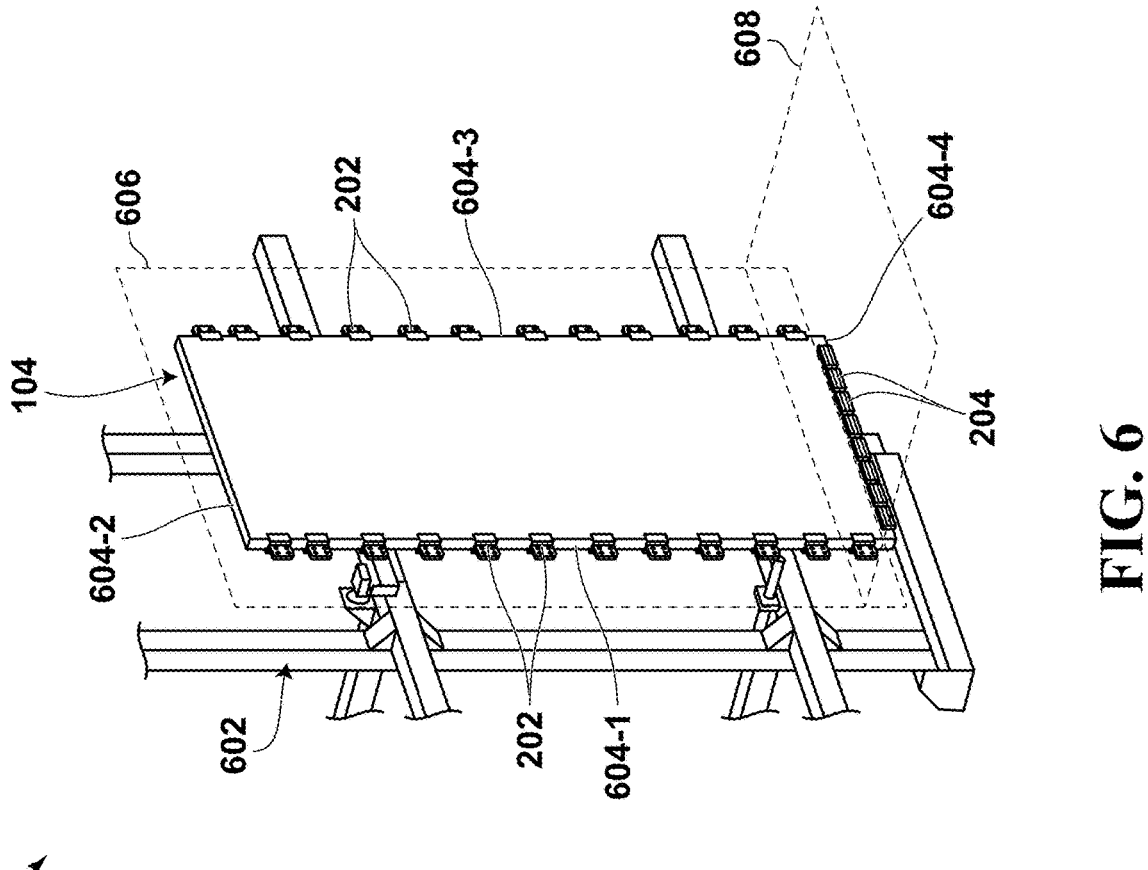
FIG. 6 is a perspective view of a single spacecraft platform panel attached to a support structure during assembly illustrating orthogonal mounting planes of brackets, according to an embodiment.

In an embodiment, panel edges receiving first brackets 202 and panel edges receiving second brackets 204 are selected to ensure that the interface between all PICs 114 on each panel 104 have a maximum of two orthogonal mounting planes. This concept is illustrated in FIG. 6, described below. This approach ensures that the panels 104 are never "sandwiched" between two parallel panels 104, avoiding jamming due to panel deformations.

Referring now to FIG. 3, shown therein is a method 300 of assembling the stable and repeatable spacecraft platform structure 102 of FIG. 1 using the bracket assembly 114 of FIGS. 2A-2C, according to an embodiment.

FIGS. 4A-4F illustrate a schematic representation of the method 300, according to an embodiment.

FIGS. 4A-4F correspond to steps 302, 304, 306, 308, 310, and 312 of FIG. 3, respectively.

FIGS. 4A-4F show method 300 as performed using a single PIC bracket assembly 114 on adjacent platform panels. It will be understood that additional PIC bracket assemblies 114 are used to further connect and support the platform panels that make up the platform structure 102 to assemble the stable and repeatable platform structure.

At 302, the method 300 includes aligning and supporting platform panels 104-1 and 104-2 in a vertical configuration using three points of support. Panel 104-1 includes sides 402, 404, 406 and panel 104-2 includes sides 408, 410, 412.

The panel 104-1, 104-2 alignment minimizes as-built interface deviations.

The vertical configuration minimizes deformations of the platform 102 due to gravity (quasi 0 G).

The three-point support ensures that the panels 104-1, 104-2 are in a stress-free state.

At 304, the method 300 includes installing PIC bracket assembly 114 between adjacent panels 104-1, 104-2. This includes temporarily securing first bracket 202 and second bracket 204 in place. There is no direct attachment to the panel 104-1, 104-2 that could deform the panels 104-1, 104-2.

Each bracket assembly 114 includes an internal bolted interface (also referred to as panel bolted interface) connecting the first bracket 202 to the second bracket 204. The bolted interface is established by inserting fasteners 208 through the first and second brackets 202, 204 and securing the brackets 202, 204 together via the fasteners 208. The panel bolted interface is designed such that each panel 104-1, 104-2 has only a maximum of two orthogonal mating planes or single interface plane in each axis (e.g., the interface 424 between 206 and 202 in FIG. 4B). This ensures that the panels 104-1, 104-2 can be removed and reinstalled without jamming between adjacent panels 104-1, 104-2.

Installation of the brackets 202, 204 on panels 104-1, 104-2, respectively, establish spaced or gapped interfaces 414 between bracket arm 218 and side 402, bracket arm 220 and side 406, bracket arm 228 and side 408, and bracket arm 230 and side 412.

At 306, the method 300 includes injecting the spaced interfaces 414 established at 304 with adhesive 416. The adhesive is an epoxy-based adhesive This includes injecting adhesive 416 into the interfaces 414 between the bracket arm 218 and panel surface 402, the bracket arm 220 and panel surface 406, the bracket arm 228 and panel surface 408, and the bracket arm 230 and panel surface 412.

This functions as a liquid shimming operation that provides a strong attachment between the brackets 202, 204 and the panels 104-1, 104-2 without introducing any stress to the assembly that would be present with a conventional approach of directly bolting the panels 104-1, 104-2 together.

The bonding agent or adhesive functions as a liquid-shimming compound when the bonding agent cures. The liquid shimming method involves the use of a viscous compound that can be either poured or injected into the gap 414. This viscous compound is specifically formulated to harden after injection, resulting in a custom-fit shim that conforms to the gap 414.

Steps 302, 304, and 306 may be considered an "initially assembly".

At 308, the method 300 includes co-drilling or match drilling a subset of the bracket assemblies 114 (e.g., two bracket assemblies per panel edge). In a respective co-drilled bracket assembly, this establishes co-drilled holes 418. An individual co-drilled hole 418 traverses through the first bracket 202, the shim plate 206, and the second bracket 204. For each of the brackets 202, 204, the co-drilled hole 414 is established in a piece of bracket material 420 that extends beyond bracket arm 218.

The co-drilled holes 418 provide repeatability to the panels 104-1, 104-2 once disassembled.

In an embodiment, at least two bracket assemblies 114 per panel edge are co-drilled (i.e., have co-drilled holes). Having at least two bracket assemblies 114 with co-drilled holes per panel edge is sufficient to provide repeatability of the interface. In an embodiment, the two bracket assemblies 114 with co-drilled holes on a given panel edge are positioned at or near distal or opposite ends of the panels. The two bracket assemblies 114 may be positioned on the panels to maximize the distance between the co-drilled bracket assemblies. This maximizes the reliability of these features.

At 310, the method 300 includes disassembling the internal bolted interface of the bracket assembly 114 to remove panel 104-1 or panel 104-2. Disassembling the bolted interface includes removing fasteners 208 to allow separation of the first bracket 202 and second bracket 204.

Figure 4A:
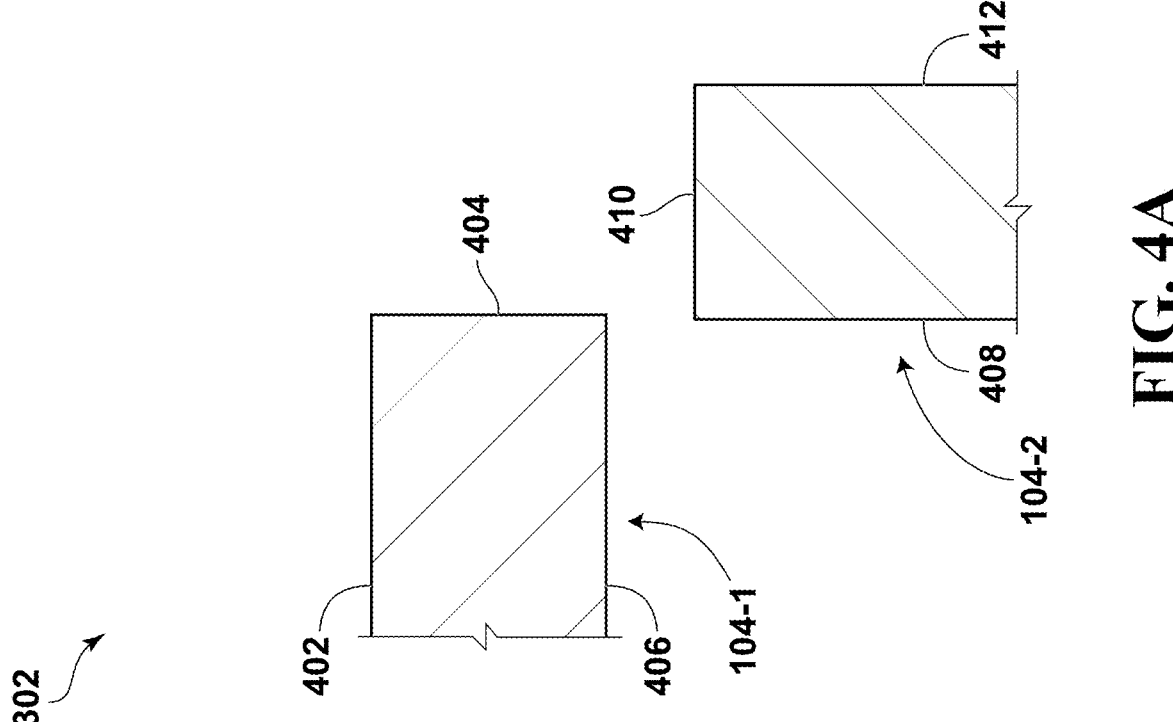
FIGS. 4A-4F are side view schematic diagrams illustrating steps of the method of FIG. 3, according to an embodiment.
Figure 4B:
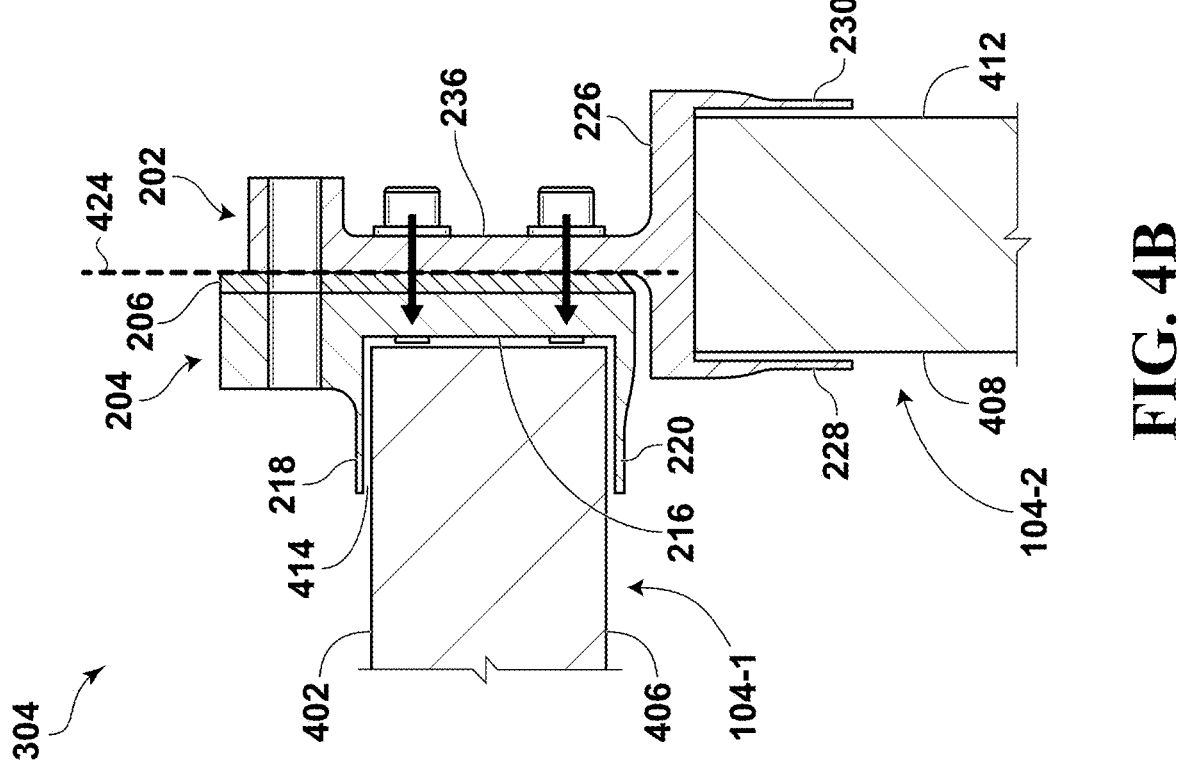
Figure 4C:
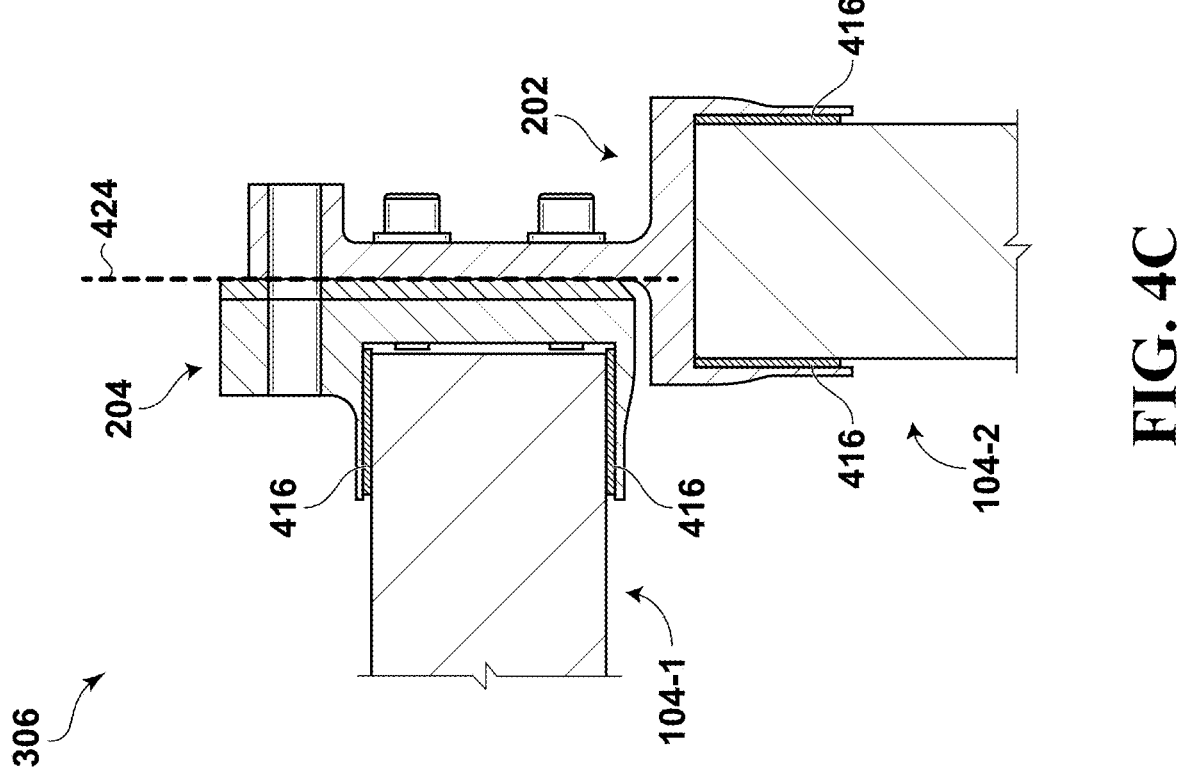
Figure 4D:
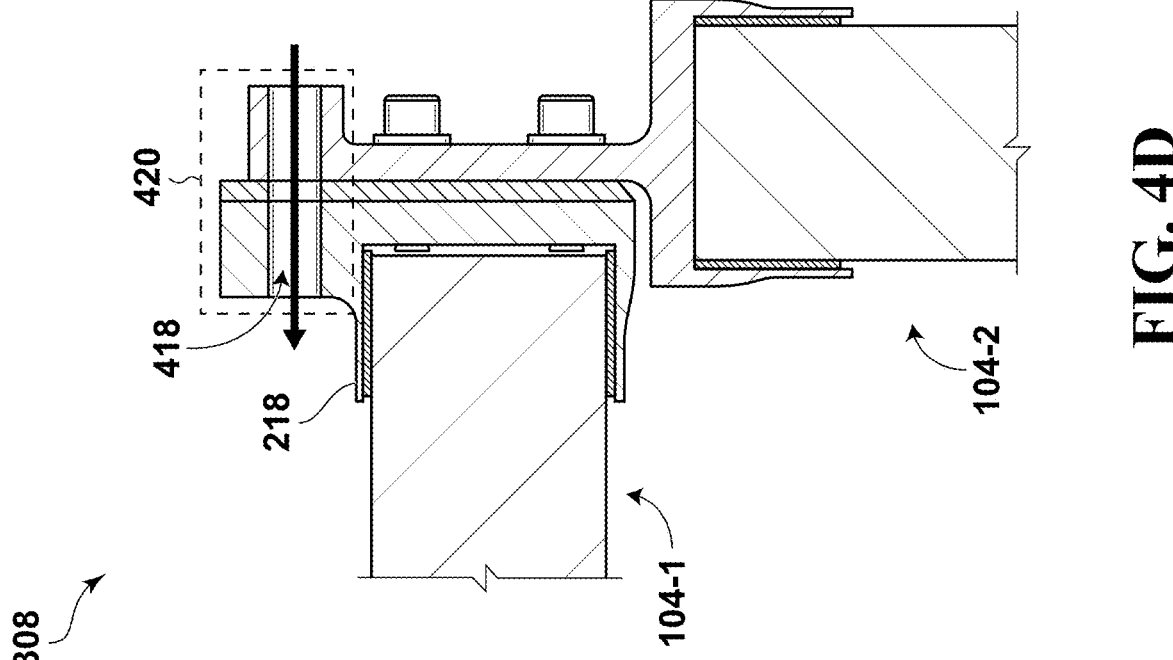
Figure 4E:
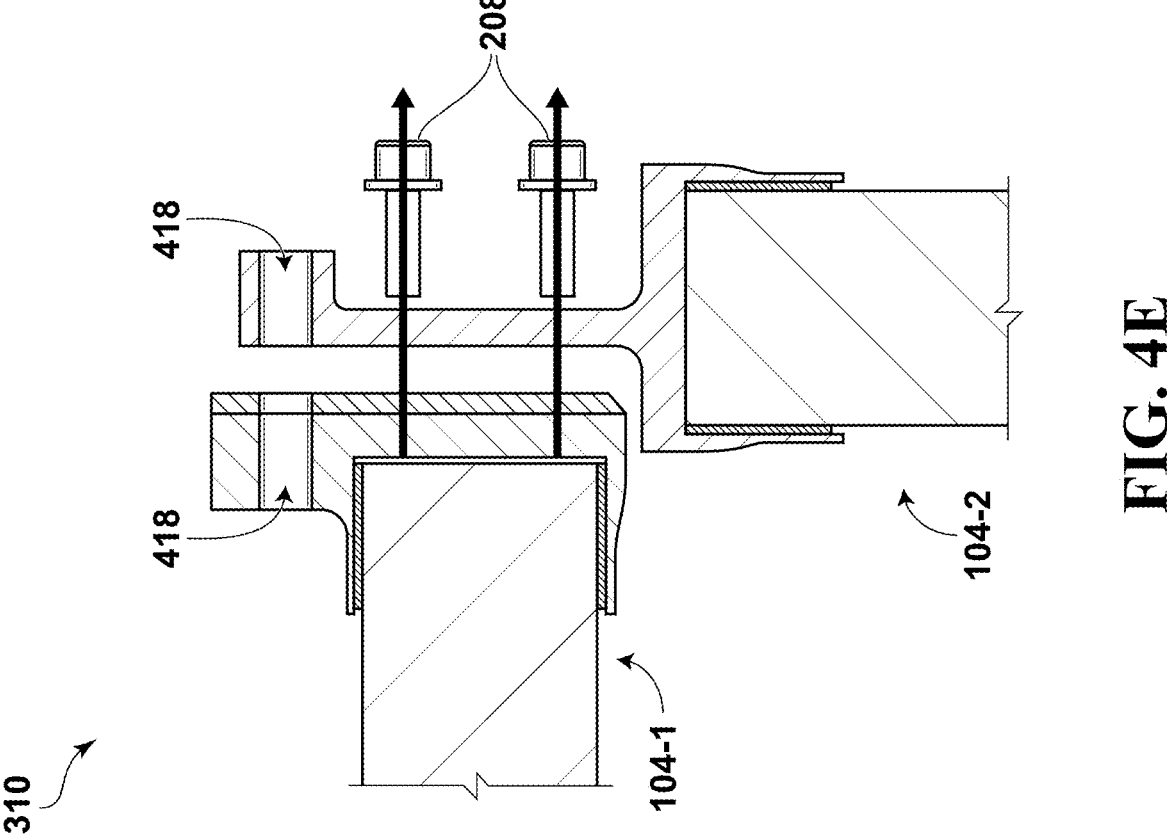
Figure 4F:
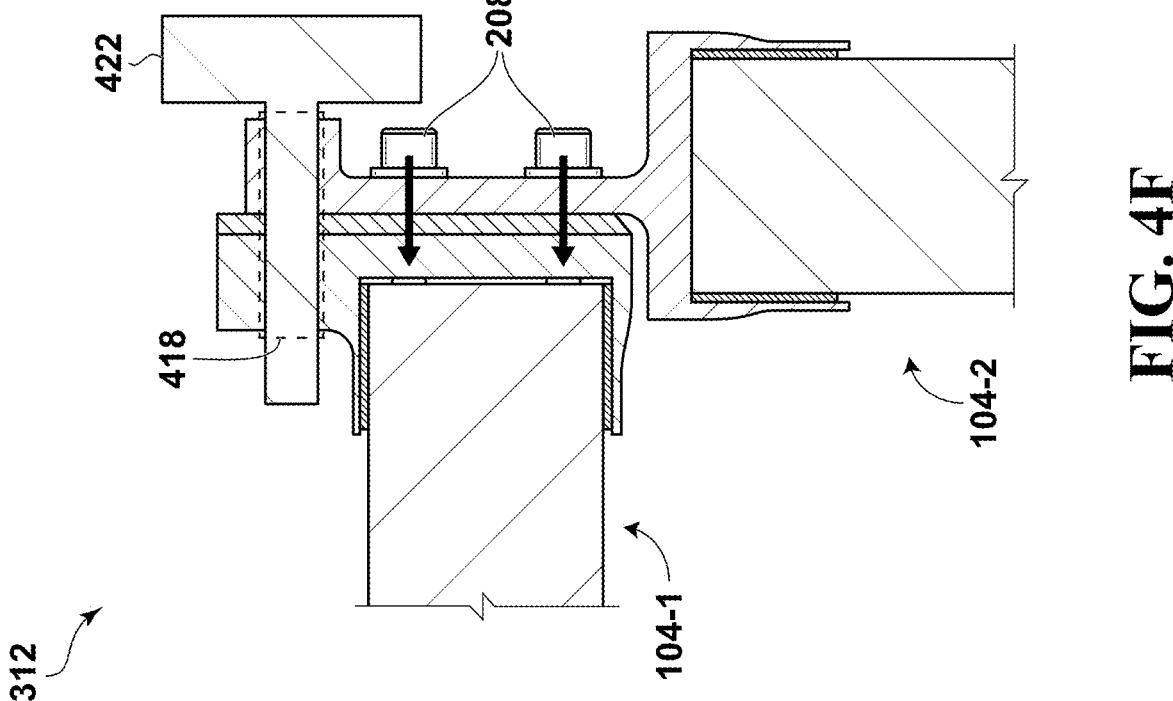

As noted above, the panel bolted interface is designed such that each panel 104-1, 104-2 has only a single interface plane in each axis, which ensures that the panels 104-1, 104-2 can be removed and reinstalled without jamming between adjacent panels 104-1, 104-2. The single interface plane is the interface between second bracket 204 (including shim 206) and first bracket 204. More specifically, the single interface plane is the interface between side 216 of second bracket 206 and flange plate 236 of first bracket 202. The interface plane is represented in FIG. 4B by hashed line 424.

At 312, the method 300 includes using the co-drilled hole 418 as a repeatability feature when reinstalling the panels 104-1, 104-2 in place. Reinstalling panel 104-1 or panel 104-2 includes reassembling the internal bolted interface of the bracket assembly 114 by re-securing fasteners 208.

Using the co-drilled hole 418 as a repeatability feature may include using an expansion pin 422 to repeatably reinstall panels 104-1, 104-2 and return the panels 104-1, 104-2 to their quasi 0 G shape present for the initial assembly.

The expansion pins 422 provide repeatability by forcing the co-drilled holes 418 created during the initial assembly to re-align. This is because the expansion pins 422 have a smaller diameter than the co-drilled holes 418 in their unexpanded state, but the same diameter as the co-drilled holes 418 once the expansion pins 422 have expanded. This ensures that when the expansion pin 422 is expanded, the expansion pin 422 realigns the co-drilled holes 418 to be coaxial.

Figure 5:
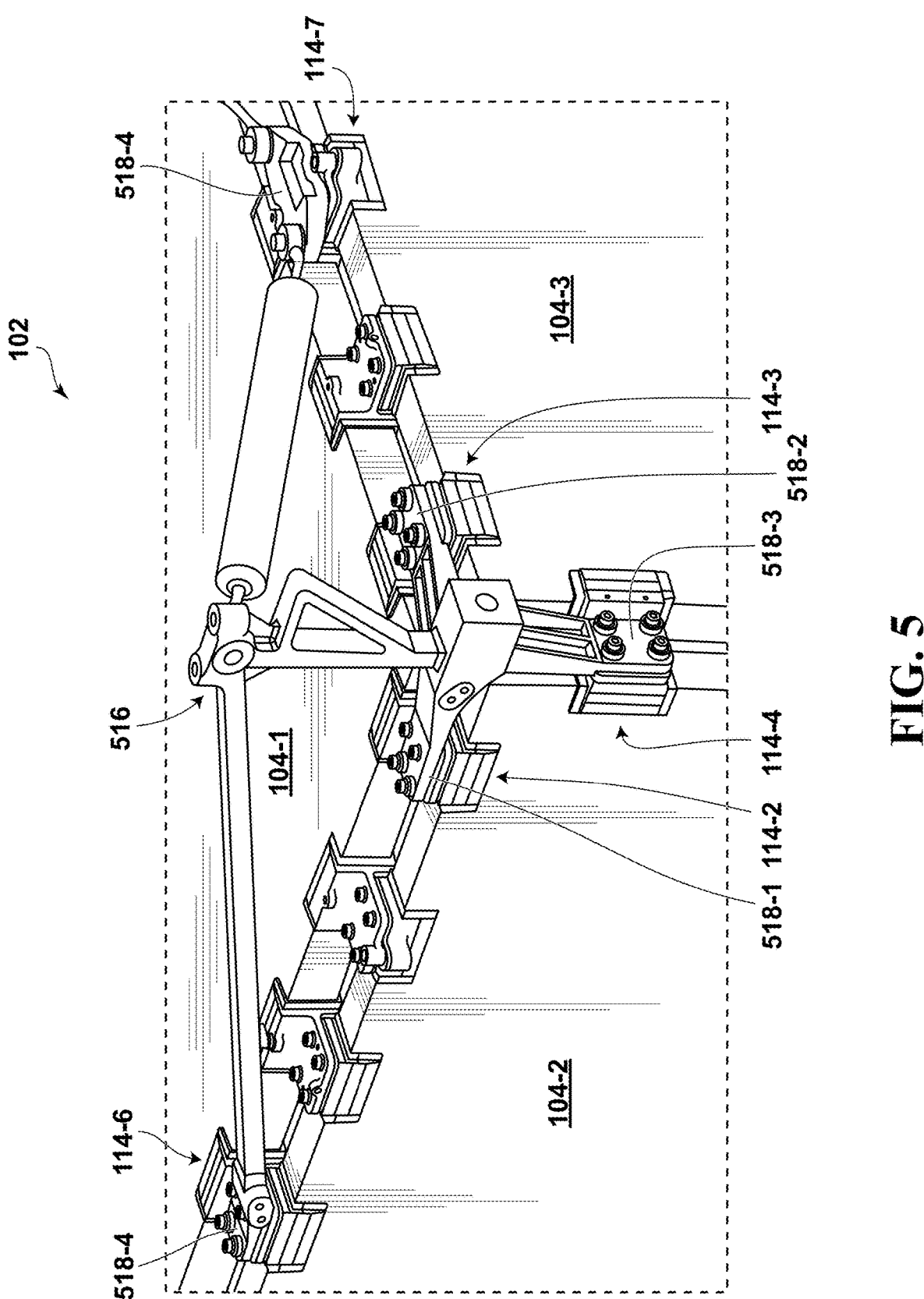
FIG. 5 is a perspective view schematic diagram of the spacecraft of FIG. 1 further including components directly mounted to panel interconnect bracket interfaces, according to an embodiment.

Referring now to FIG. 5, shown therein is the spacecraft platform 102 of FIG. 1 further including components directly mounted to panel interconnect bracket 114 interfaces, according to an embodiment.

In some embodiments, as in FIG. 5, the internal bolted interface of a bracket assembly 114 may be used as a mounting feature for directly mounting components to the bracket assembly 114 (and more particularly to the bracket assembly interface). This may include "sandwiching" the component being mounted into the existing PIC pair bolted interface. Such feature of the bracket assembly 114 may be particularly advantageous where high structural margins are required for mounted components.

In FIG. 5, apparatus 516 has been mounted to spacecraft platform 102 using bracket assemblies 114-2, 114-3, 114-4, 114-6. Apparatus 516 includes components 518-1, 518-2, 518-3, and 518-4 which serve as mechanisms by which apparatus 516 can be mounted to platform 102. In particular, respective internal bolted interfaces of bracket assemblies 114-2, 114-3, 114-4, and 114-6 are being used as a mounting feature for mounting components 518-1, 518-2, 518-3, and 518-4 to the bracket assemblies 114-2, 114-3, 114-4, 114-6, respectively. The components 518-1, 518-2, 518-3, and 518-4 are each sized and configured to mount to the bracket assemblies 114-2, 114-3, 114-3, 114-6 (e.g., by including fastener holds that align with the fastener holes of the bracket assembly 114 to enable attachment via fasteners 208. In such cases, fasteners 208 may be specially configured to connect not only first and second brackets 202, 204 but also the component being mounted.

Referring now to FIG. 6, shown therein is an example spacecraft platform panel 104 attached to an assembly support structure 602, according to an embodiment.

Panel 104 includes edges 604-1, 604-2, 604-3, and 604-4.

Multiple first brackets 202 are disposed on panel edge 604-1. These first brackets 202 will couple to second brackets 204 on an edge of an adjacent panel when the spacecraft platform is assembled.

Multiple first brackets 202 are disposed on panel edge 604-3. These first brackets 202 will couple to second brackets on an edge of an adjacent panel when the spacecraft platform is assembled.

Multiple second brackets 204 are disposed on panel edge 604-3. These second brackets 204 will couple to first brackets on an edge of an adjacent panel when the spacecraft platform is assembled.

Each PIC bracket 202, 204 has an internal interface plane. This internal interface plane is illustrated in FIG. 4B by hashed line 424 (interface plane 424). This interface plane 424 is the interface that is disassembled when a panel (e.g., panel 104) is removed (e.g., during assembly). The interface planes 424 are not shown in FIG. 6 but are understood to be present.

All PIC brackets along a given panel edge have coplanar interface planes 424. In other words, all PIC brackets along panel edge 604-1 (i.e., first brackets 202) have coplanar interface planes 424, all PIC brackets along panel edge 604-3 (i.e., first brackets 202) have coplanar interface planes 424, and all PIC brackets along panel edge 604-4 (i.e., second brackets 204) have coplanar interface planes 424.

Along each individual panel edge 108, all PIC brackets 202, 204 have coplanar interface planes 424.

Different panel edges on the same panel can have different interface plane orientations. For example, panel edge 604-1 and panel edge 604-4 have interface planes 606, 608, respectively, which have different interface plane orientations (being orthogonal to one another). Panel edge 604-3 and panel edge 604-4 have interface planes 606, 608, respectively, which have different interface plane orientations (being orthogonal to one another). Panel edge 604-1 and panel edge 604-3 have interface planes 606 that have the same interface plane orientation (coplanar).

Each panel does not have more than two orthogonal mounting planes to ensure the panel does not jam between adjacent panels. For example, panel 104 has first and second mounting planes 606, 608 that are orthogonal to one another.

In the example of FIG. 6, all first brackets 202 (along panel edges 604-1, 604-3) have a common mounting plane 606 and all second brackets 204 along panel edge 604-4 have a common mounting plane 608. As noted, the mounting planes 606, 608 are orthogonal to one another.

While the above description provides examples of one or more apparatus, methods, or systems, it will be appreciated that other apparatus, methods, or systems may be within the scope of the claims as interpreted by one of skill in the art.

The invention claimed is:

1. A method of assembling a spacecraft platform structure comprising a plurality of platform panels, the method comprising:

providing a plurality of panel interconnect (PIC) bracket assemblies for connecting first and second adjacent platform panels, each PIC bracket assembly comprising:

a first bracket comprising a U-clip portion for receiving an edge of the first platform panel and a flange plate extending from the U-clip portion orthogonal to the edge when the edge is disposed in the U-clip portion;

a second bracket comprising a U-clip portion for receiving an edge of the second platform panel;

wherein the edge of the first platform panel and the edge of the second platform panel are orthogonal to one another in an assembled configuration of the spacecraft platform structure;

wherein the U-clip portions of the first and second brackets each include first and second bracket arms that attach to face sheets of the first and second platform panels, respectively; and a bolted interface for connecting the flange plate of the first bracket to a portion of the second bracket disposed along the edge of the second platform panel;

supporting and aligning the first and second platform panels in a vertical configuration using three points of support;

installing the PIC bracket assemblies between the first and second platform panels, the installing including temporarily securing the PIC bracket assemblies in place without direct attachment to the first and second platform panels;

applying adhesive between the first and second bracket arms of the first and second brackets to bond the PIC bracket assemblies to the first and second platform panels;

co-drilling a subset of the PIC bracket assemblies to establish co-drilled holes that traverse the first and second bracket;

disassembling the bolted interfaces of PIC bracket assemblies to remove the first or second platform panel; and reinstalling the first or second panel using an expansion pin in the co-drilled holes to return the first or second platform panel to its quasi OG shape.

2. The method of claim 1, wherein the spacecraft platform structure is a spacecraft bus.

3. The method of claim 1, wherein the subset of the PIC bracket assemblies is at least two PIC bracket assemblies.

4. The method of claim 1, wherein the at least two brackets include the two outermost PIC bracket assemblies along the edges.

5. The method of claim 4, wherein the two outermost PIC bracket assemblies are located at or near opposing ends of the edges of the first and second platform panels.

6. The method of claim 1, wherein the expansion pin has a smaller diameter than the co-drilled holes when unexpanded and the same diameter as the co-drilled holes once the expansion pin has expanded and realigns the co-drilled holes to be coaxial once expanded.

7. The method of claim 1, wherein the first and second brackets are arranged on the plurality of panels such that each panel of the plurality of panels does not have more than two orthogonal mounting planes defined by mounting interfaces of the first and second brackets on that panel.

8. The method of claim 1, further comprising mounting a device configured for use in space to at least at least one of the PIC bracket assemblies via the bolted interface.

9. The method of claim 8, wherein the device includes at least two supports, and wherein the two supports are mounted to different ones of the PIC bracket assemblies via their respective bolted interfaces.

10. The method of claim 1, wherein the first and second bracket arms include a plurality of holes, and wherein applying the adhesive includes injecting the adhesive through the plurality of holes.

11. The method of claim 1, wherein applying the adhesive includes injecting the adhesive at multiple edges of each of the first and second bracket arms.

12. The method of claim 1, wherein the flange plate is disposed such that an interface plane formed between the flange plate and the portion of the second bracket disposed along the edge of the second platform panel is at approximately a midline of a portion of the first bracket disposed along the edge of the first platform panel.

13. The method of claim 1, wherein the bolted interface is configured such that the first and second platform panels each have only a single interface plane in each axis.

14. An apparatus comprising:

a spacecraft platform structure comprising:

a plurality of panels connected along their respective edges using a plurality of panel interconnect (PIC) bracket assemblies, wherein each PIC bracket assembly includes first and second brackets each bonded to panel face sheets along edges of adjacent panels, the first and second brackets secured together by fasteners;

wherein each bracket comprises a top side connected to two adjacent arms, and wherein each top side and arm has a thicker middle portion flanked by adjacent thinner portions.

15. The apparatus of claim 14, wherein at least two PIC bracket assemblies per edge of the spacecraft platform structure have co-drilled holes for repeatable installation of the panels during assembly.

16. A system for connecting first and second adjacent panels of a spacecraft platform, the system comprising:

a plurality of bracket assemblies for connecting the adjacent panels along first and second orthogonal edges, respectively, each bracket assembly comprising:

a first bracket mounted on the first orthogonal edge, the first bracket comprising first, second, and third sides defining a square U shaped recess for receiving the first orthogonal edge, the first and second sides being generally parallel to one another and extending in the same direction from opposing edges of the third side, the third side generally orthogonal to the first and second sides, the first bracket further comprising a flange plate generally orthogonal to and extending from the third side in a direction opposite the first and second sides, the flange plate disposed between the first side and the second side;

a second bracket mounted on the second orthogonal edge, the second bracket comprising first, second, and third sides defining a square U shaped recess for receiving the second orthogonal edge, the first and second sides being generally parallel to one another and extending in the same direction from opposing edges of the third side, the third side generally orthogonal to the first and second sides; and at least one fastener for securing the flange plate to the third side of the second bracket;

wherein the first and second sides of the first bracket are bonded to top and bottom face sheets of the first adjacent panel and the first and second sides of the second bracket are bonded to top and bottom face sheets of the second adjacent panel.

17. The system of claim 16, wherein the first, second, and third sides have a thicker middle portion flanked by adjacent thinner portions.

18. The system of claim 16, wherein the flange plate is disposed substantially at a midline of the first bracket between the first side and the second side.

19. The system of claim 16, wherein the flange plate is disposed such that an interface plane formed between the flange plate and a portion of the second bracket disposed along the second orthogonal edge is at approximately a midline of a portion of the first bracket disposed along the first orthogonal edge.

20. The system of claim 16, wherein the flange plate is disposed at a position that substantially aligns an interface plane formed between the flange plate and the third side of the second bracket with a neutral axis of the adjacent panels.

* * * * *